United States Patent
Funaki

(10) Patent No.: US 7,589,714 B2
(45) Date of Patent: Sep. 15, 2009

(54) TACTILE DISPLAY DEVICE AND TOUCH PANEL APPARATUS WITH TACTILE DISPLAY FUNCTION USING ELECTRORHEOLOGICAL FLUID

(75) Inventor: Jun Funaki, Saitama (JP)

(73) Assignee: Pioneer Corporation, Tokyo (JP)

( * ) Notice: Subject to any disclaimer, the term of this patent is extended or adjusted under 35 U.S.C. 154(b) by 937 days.

(21) Appl. No.: 11/158,325

(22) Filed: Jun. 22, 2005

(65) Prior Publication Data

US 2005/0285846 A1 Dec. 29, 2005

(30) Foreign Application Priority Data

Jun. 23, 2004 (JP) .............................. 2004-185323

(51) Int. Cl.
*G06F 3/041* (2006.01)
*G06F 3/042* (2006.01)
(52) U.S. Cl. ...................................... 345/173; 345/175
(58) Field of Classification Search ................ 345/173, 345/81, 156, 175; 340/407.1–407.2; 434/113–114
See application file for complete search history.

(56) References Cited

U.S. PATENT DOCUMENTS

| 3,229,387 | A | * | 1/1966 | Linvill | 434/114 |
| 3,740,446 | A | * | 6/1973 | Benson | 434/114 |
| 5,222,895 | A | * | 6/1993 | Fricke | 434/113 |
| 5,496,174 | A | * | 3/1996 | Garner | 434/114 |
| 5,574,576 | A | * | 11/1996 | Martin | 358/484 |
| 2002/0158836 | A1 | * | 10/2002 | Ishmael et al. | 345/156 |
| 2005/0030292 | A1 | * | 2/2005 | Diederiks | 345/173 |
| 2006/0099808 | A1 | * | 5/2006 | Kondo | 438/674 |
| 2007/0182718 | A1 | * | 8/2007 | Schoener et al. | 345/173 |
| 2007/0229233 | A1 | * | 10/2007 | Dort | 340/407.1 |

FOREIGN PATENT DOCUMENTS

| JP | 11-273501 | 10/1999 |
| JP | 2000-089895 | 3/2000 |

* cited by examiner

*Primary Examiner*—Chanh Nguyen
*Assistant Examiner*—Robert M Stone
(74) *Attorney, Agent, or Firm*—Nixon & Vanderhye, PC

(57) ABSTRACT

Conductivity of a photoconductive layer changes in accordance with a display pattern made of black and white, which is displayed on a display device of a touch panel apparatus with tactile display function. With this change of the conductivity, viscosity of an electrorheological fluid layer changes in accordance with this display pattern. This change of the viscosity is presented to an operator, as tactile information corresponding to the display pattern displayed as the visual information.

13 Claims, 4 Drawing Sheets (a)

(b)

TACTILE DISPLAY DEVICE AND TOUCH PANEL APPARATUS WITH TACTILE DISPLAY FUNCTION USING ELECTRORHEOLOGICAL FLUID

BACKGROUND OF THE INVENTION

1. Field of the Invention

The present invention relates to a tactile display device for displaying tactile information and further relates to a touch panel apparatus with such a tactile display device.

2. Description of the Related Art

As such a tactile display method, there is presented a method of controlling an appearance of a convex key by means of an electrorheological fluid (ER fluid), for example (Japanese Patent Application Laid-Open No. Hei 11-273501).

In this method, the electrorheological fluid is sealed within a plate-like receptacle or box disposed above a display device. Then, an electrical power distribution over this fluid is controlled in such a manner that a part or area of the electrorheological fluid (i.e. the fluid which viscosity is changed by electricity) corresponding to the convex key is relieved or embossed by means of a pump as a pressure device. As a result, an embossed key can be appeared.

Furthermore, there is also presented a technology for applying a counterforce to a display element in response to a deformation, by means of an electrorheological fluid (Japanese Patent Application Laid-Open No. 2000-89895 and so on).

However, the aforementioned related arts have a problem as described below.

In order to change the viscosity of the electrorheological fluid, it is necessary to control voltage which is applied to the electrorheological fluid, in accordance with "a pattern to be displayed" (hereinafter referred to as a "display pattern" as appropriate) and the like. Therefore, a special device for performing such a control is required, which increases a size of the apparatus and/or causes heavy-duty operation. That is, from a technical viewpoint, it is difficult to display the tactile information efficiently.

SUMMARY OF THE INVENTION

The present invention has been accomplished in view of the aforementioned problem, for example. It is therefore an object of the present invention to provide a tactile display device for displaying the tactile information effectively. It is a further object of the present invention to present a touch panel apparatus with tactile display function having such a tactile display device.

(Tactile Display Device)

The above object of the present invention is achieved by a tactile display device disposed on a display screen for outputting display light corresponding to a display pattern, said tactile display device comprising: a pair of electrodes having a light transmissive property and disposed opposite to the display screen; a characteristic change layer disposed between said pair of electrodes, said characteristic change layer having a light transmissive property, wherein at least one of conductivity and magnetic permeability of said characteristic change layer changes at each part on the display screen in response to intensity of the display light; and an electrorheological fluid layer disposed between said pair of electrodes and opposite to said characteristic change layer, said electrorheological fluid layer having a light transmissive property, wherein viscosity of said electrorheological fluid layer changes at each part on the display screen in response to applied voltage applied through said characteristic change layer by said pair of electrodes.

According to the tactile display device of the invention, electric voltage is applied between a pair of electrodes during the operation. A portion of this electric voltage is applied to the electrorheological fluid layer. The "electrorheological fluid" herein means a fluid having a property of changing its viscosity in response to the applied voltage. If the applied voltage for the electrorheological fluid layer is changed in accordance with a pattern to be displayed, the viscosity can be increased (i.e. become harder) in the inside of the pattern, and decreased (i.e. become softer) in the remaining area. Therefore, the operator can feel tactily a shape or outline of the pattern. That is, the tactile information can be presented.

Specifically, an effort to control the viscosity of the electrorheological fluid by controlling the applied voltage for each pixel composing a certain pattern may cause the aforementioned problem as seen in the related arts. That is, the ineffectively heavy-duty operation reduces the efficiency.

Nevertheless, in the tactile display device of the present invention, such a problem is solved by disposing the characteristic change layer opposite to the electrorheological fluid layer.

The "characteristic change layer" herein means a layer made of a material having a property of changing at least one of the conductivity and the magnetic permeability in response to the intensity of the irradiation light. If the intensity of the irradiation light is changed relative to the characteristic change layer in accordance with the display pattern, at least one of the conductivity and the magnetic permeability of this characteristic change layer changes in accordance with the display pattern. This change in or of the conductivity or the magnetic permeability causes a change in or of partial pressure applied to the electrorheological fluid, as well as a viscosity change (i.e. a change of a viscosity) of the electrorheological fluid layer. For example, it is possible to harden (or soften) a part of the electrorheological fluid layer with the higher intensity of the irradiation light and soften (or harden) a part of the electrorheological fluid layer with the lower intensity of the irradiation light. That is, the tactile information as described above can be presented.

Furthermore, since the pair of electrodes, the characteristic change layer and the electrorheological fluid layer have the light transmissive property, respectively, the change in or of the intensity of the irradiation light is represented by the visual information presented to the operator through these layers, that is, represented by the change in or of the display light outputted in accordance with the display pattern displayed on the display screen. For example, if the display pattern displayed on the display screen is of a binary pattern made of black and white, the display light for the white part represents the higher intensity of the irradiation light, and the display light for the black part (including a case that nothing is displayed) represents the lower intensity of the irradiation light. Thus, according to the tactile display device of the present invention, it is possible to use the display pattern, which is visual information, as a light source of the irradiation light for presenting the tactile information. Therefore, it is possible to present the tactile information extremely efficiency.

On the other hand, in the tactile display device of the present invention, at least one of the conductivity and the magnetic permeability of the characteristic change layer changes at each part on the display screen. The expression "at each part" herein is contemplated to refer to a condition that an entire surface of the characteristic change layer does not change evenly or equally. Therefore, the conductivity or the magnetic permeability does not always change in accordance with the display pattern displayed on the display screen, or analogously with the display pattern. In order to display the tactile information in association with the visual information to a certain extent, however, the change in or of the conductivity or the magnetic permeability preferably resembles to the display pattern displayed on the display screen at least. From this point of view, the characteristic change layer preferably exhibits an anisotropic nature with lower electric resistance in a direction perpendicular to the substrate (or display screen) and higher electric resistance in a direction parallel to the substrate (or display screen).

Incidentally, if the conductivity of the characteristic change layer is excessive, the voltage distribution hardly arises in a plane of the characteristic change layer, and thereby in a plane of the electrorheological fluid layer. Therefore, it is preferable that the electrical resistance at a part of the characteristic change layer where no irradiation light (display light) reaches is sufficiently and considerably high.

Furthermore, the same discussion can be applied to the electrorheological fluid layer which is disposed opposite to the characteristic change layer. The viscosity of the electrorheological fluid layer also changes at each part on the display screen, in response to the applied voltage. The expression "at each part" in this context is also contemplated to refer to a condition that an entire surface of the electrorheological fluid layer does not change evenly or equally. That is, the viscosity does not always change in accordance with the display pattern displayed on the display screen, or analogously with the display pattern, insofar as the operator can feel any difference, for example, soft or hard, when touching the corresponding element. In order to recognize or feel the display pattern visually and tactily, however, the viscosity change preferably resembles to the display pattern at least. Therefore, the electrorheological fluid layer preferably exhibits an anisotropic nature with lower electric resistance in a direction perpendicular to the substrate (e.g. characteristic change layer) and higher electric resistance in a direction parallel to the substrate (e.g. characteristic change layer), so that the tactile information is presented or displayed in accordance with the display light as precise as possible.

Incidentally, if the conductivity of the electrorheological fluid layer is high, the voltage difference distribution hardly arises at each point in a plane of the electrorheological fluid layer. Therefore, it is even preferable that the electrorheological fluid layer is dielectric and the thickness thereof is extremely thin (so that the electrical resistance in a direction perpendicular to the substrate is extremely lower than that in a direction parallel to the substrate).

Incidentally, the thickness of the electrorheological fluid layer, the thickness of the characteristic change layer, the intensity of the display light, the applied voltage and so on, which are important to display such a tactile information, are respectively predetermined, experimentally, empirically otherwise via simulation, in view of a shape or tactile impression of the tactile information to be displayed, as well as an apparatus size required for the entire tactile display device.

Incidentally, the expression "having a light transmissive property" herein is contemplated to include everything other than object or element having an optical impermeability. Therefore, it is not contemplated to define a precise range of the optical permeability.

Incidentally, insofar as the characteristic change layer of the present invention has properties herein disclosed, the constitutional material, as well as a range of changing the conductivity or the magnetic permeability, is not limited in any sense.

In an aspect of the tactile display device, said characteristic change layer is a photoconductive layer, the conductivity of which changes at each part on the display screen in response to the intensity of the display light.

According to this aspect, it is relatively easy to achieve one or more properties required for the characteristic change layer by employing a photoconductive layer, such as a semiconductor layer with a higher electrical resistance without any irradiation light, as the characteristic change layer.

In another aspect of the tactile display device, there is further provided with an elastic layer beneath said electrorheological fluid layer above the display screen, said elastic layer having elastic modulus less than that of said electrorheological fluid layer.

In the tactile display device of the present invention, if the thickness of the electrorheological fluid layer realizing the tactile display is excessively thick, the applied voltage tends to be excessively high although the tactile impression is improved. If the thickness is excessively thin, the tactile impression is hardly obtained satisfactorily although the required applied voltage is decreased.

According to this aspect, since there is provided with the elastic layer beneath the electrorheological fluid layer above the display screen, in which the elastic modulus of the elastic layer is less than that of the electrorheological layer, it is possible to improve the tactile impression for the operator and display the higher quality tactile information efficiently.

In another aspect of the tactile display apparatus, the apparatus is further provided with a flexible substrate having a light transmissive property, wherein said pair of electrodes, said characteristic change layer and said electrorheological fluid layer are disposed above said flexible substrate.

According to this aspect, the operator can suitably feel or recognize the tactile information resulted from the viscosity change of the electrorheological fluid layer, with the aid of the flexible substrate which may be the plastic film such as PET (polyethylene terephthalate). The "flexible" herein means a nature in which the operator can feel or recognize the deformation by touching (in a sense defined by a typical range of the concept) the interest object.

(First Touch Panel Apparatus with Tactile Display Function)
The above object of the present invention is achieved by a first touch panel apparatus with tactile display function, said touch panel apparatus comprising: an optically transparent touch panel disposed opposite to a display screen for outputting display light and for allowing an input operation of depressing a part of said optically transparent touch panel corresponding to a part of the display screen in which visual information was displayed, the visual information displayed as the display pattern on the display screen and the visual information being for prompting the input operation; and said tactile display device as described above disposed opposite to said optically transparent touch panel at a side different from another side where said optically transparent touch panel is directed toward the display screen.

According to the first touch panel apparatus with tactile display function, a part of the touch panel corresponding to the visual information displayed as the display pattern to prompt the input operation on the display screen is depressed, during the operation. That is, the operation to be performed is almost the same as the operation for the typical touch panel as seen in an ATM (Automated Teller Machine) for a bank, a ticket bending machine in a station, and so on.

Furthermore, the touch panel apparatus with tactile display function includes the tactile display device of the present invention. The touch panel apparatus according to the present invention operates as follows, for example.

In the tactile display device disposed on the information display surface (i.e. a surface contrary to another surface toward the display screen of the display device) of the touch panel apparatus, it is possible to present to the operator the tactile information corresponding to the visual information by means of the irradiation light which is the display light of the visual information displayed on the display screen.

For example, in the ATM, there is presented the tactily recognizable tactile information "0" to "9", correspondingly to the visual information indicating "0" to "9". The operator can operate the touch panel, while viewing the visual information displayed on the display screen, and feeling the reliable tactile impression (or the reliable impression for the operation) from the tactile information presented by the tactile display device. That is, according to the first embodiment of the touch panel apparatus with tactile display function, it is possible to realize the extremely high quality tactile impression, efficiently.

In another aspect of the first touch panel apparatus with tactile display function, the apparatus is further provided with a change addition device for further changing the viscosity of at least a part of said electrorheological fluid layer, if said at least a part of said electrorheological fluid layer is depressed.

In the tactile display device of the present invention, an after-touch-reaction may be important in addition to the tactile impression. For example, in the case that a pressable button is displayed as the tactile information, it is difficult to judge whether or not the button is actually depressed, although it is possible to recognize the existence and the position of the button.

This aspect is particularly effective in such a case. The change addition device changes the viscosity at least part of the electrorheological fluid layer when this part is depressed. Therefore, it is possible to display the tactile information with the after-touch-reaction.

For example, once the operator actually depressed the pressable button tactily displayed, the change addition device detects a fact that the button is depressed, and changes directly or indirectly the intensity of the irradiation light toward the characteristic change layer, so that the pressable button, which has been hard, become softer. From this, the operator can recognize easily and reliably a fact that the pressable button is depressed. Incidentally, the tactile information with the after-touch-reaction presented by the change addition device is not limited to this embodiment, but includes a wide variety of the viscosity change of the electrorheological fluid which has any relationship with the operator's operation.

In another aspect of the first touch panel apparatus with tactile display function, the apparatus is further provided with a display device having the display screen and for displaying the visual information on the display screen.

In this aspect, since there is further provided with the display device having the display screen, it is easy to reduce work-load for a series of processings for displaying the display pattern on the display screen and presenting the corresponding tactile information and other processings. Therefore, it is possible to realize a further efficient touch panel apparatus with tactile display function.

(Second Touch Panel Apparatus with Tactile Display Function)

The above object of the present invention is achieved by a second touch panel apparatus with tactile display function comprising: a tactile display device disposed on a display screen for outputting display light corresponding to a display pattern, said device comprising: (1) a pair of electrodes having a light transmissive property and disposed opposite to the display screen; (2) a characteristic change layer disposed between said pair of electrodes, said characteristic change layer having a light transmissive property, wherein at least one of conductivity and magnetic permeability of said characteristic change layer changes at each part on the display screen in response to intensity of the display light; and (3) an electrorheological fluid layer disposed between said pair of electrodes and opposite to said characteristic change layer, said electrorheological fluid layer having a light transmissive property, wherein viscosity of said electrorheological fluid layer changes at each part on the display screen in response to applied voltage applied through said characteristic change layer by said pair of electrodes; an optically transparent touch panel disposed between said tactile display device and the display screen and opposite to the display screen, said optically transparent touch panel allowing an input operation of depressing a part corresponding to a part of the display screen in which visual information was displayed, the visual information displayed as the display pattern on the display screen and the visual information being for prompting the input operation; and a change addition device for further changing the viscosity of at least a part of said electrorheological fluid layer, if said at least a part of said electrorheological fluid layer is depressed.

Although the viscosity of the electrorheological fluid layer should not change evenly or equally over the entire surface of the electrorheological fluid layer in the first touch panel apparatus described above, the viscosity of the electrorheological fluid layer may change evenly or equally over the entire surface of the electrorheological fluid layer in the second touch panel apparatus. In the latter case, if the operator touches the electrorheological fluid layer directly or indirectly, the entire surface of the electrorheological fluid layer may change evenly or equally into a viscosity level different from a viscosity level before the operator's touch. That is, when the operator does an action "touch", he/she can feel or recognize the tactile information as the viscosity change. Therefore, insofar as there is provided with the change addition device for causing the viscosity change, this second embodiment is also encompassed within a range of embodiments of the touch panel apparatus with tactile display function according to the present invention.

In another aspect of the first and second touch panel apparatuses with tactile display function further including the change addition device, there is further provided with a display device having the display screen and for displaying the visual information on the display screen, wherein said change addition device further changes the viscosity for a change of the visual information by said display device.

According to this aspect, the viscosity change of the electrorheological fluid layer is presented as a change in or of the visual information such as the display pattern displayed on the display device. Such a change means a change in or of the display pattern, and/or a change in or of the intensity of the display light, for example. Realizing the viscosity change by changing the visual information simplifies the construction or structure of the touch panel apparatus, which is further efficient.

As described above, in the tactile display device of the invention, since there are provided with a pair of electrodes, an electrorheological fluid layer and a characteristic change layer, the tactile information can be displayed efficiently. In the first touch panel apparatus with tactile display function, since there are provided with a touch panel device and the tactile display device, the extremely high quality tactile impression can be realized efficiently. In the second touch panel apparatus with tactile display function, there are provided with a touch panel, the tactile display device and a change addition device, the tactile information can be displayed efficiently.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Embodiments of the present invention will now be discussed, with reference to drawings.

First Embodiment (Structure of Touch Panel Apparatus 10)

Figure 1:
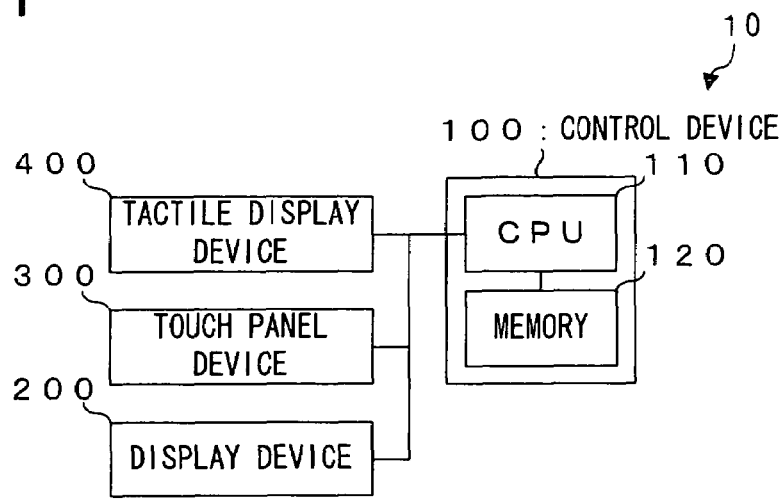
FIG. 1 is a block diagram illustrating a touch panel apparatus in a first embodiment of the present invention.

First of all, an explanation will be made on a structure of the touch panel apparatus with tactile display function according to the first embodiment of the invention (hereinafter referred to as a "touch panel apparatus 10" as appropriate), with reference to FIG. 1. FIG. 1 shows the touch panel apparatus 10 in a block diagram.

In FIG. 1, the touch panel apparatus 10 is provided with: a control device 100; a display device 200; a touch panel device 300; and a tactile display device 400. The touch panel apparatus 10 is an example of the touch panel apparatus with tactile display function according to the present invention, which is constructed in such a manner that information can be inputted via the touch panel device 300, with the tactile information inputted via the tactile display device 400, on the basis of various key images, such as numerics or characters, visually displayed on the display device 200.

The control device 100 is provided with: a CPU (Central Processing Unit) 110; and a memory 120. The CPU 110 is a control unit for controlling various parts of the touch panel apparatus 10, as mentioned later. The memory 120 is constructed so as to temporarily store data generated during a control process of controlling an operation of the touch panel apparatus 10 by the CPU 110.

The display device 200 is an example of the "display device" according to the present invention, which is constructed so as to display the visual information to prompt the input operation, such as various key images of numerics and/or characters. The display device 200 may be an LCD (Liquid Crystal Display), an OEL (Organic Electro Luminescence) display, a CRT (Cathode Ray Tube) display, a PDP (Plasma Display Panel) and so on. Incidentally, in this embodiment, each pixel of the display device 200, which is not shown in the figure, is adapted to exhibit white or black (i.e. display nothing).

The touch panel device 300 is an example of the "touch panel" according to the present invention, which is constructed so as to specify coordinates of a depressed part (point or area), when the operator depresses the corresponding part in response to the prompt of the visual information displayed on the display device 200. In other words, the device 300 is constructed so as to specify which visual information is selected. The detail structure of the touch panel device 300 will be described later.

The tactile display device 400 is an example of the "tactile display device" according to the present invention, which is constructed so as to give the tactile information to the operator, when the operator operates the touch panel device 300 to input some information. The detail structure of the tactile display device 400 will be described later.

Figure 2:
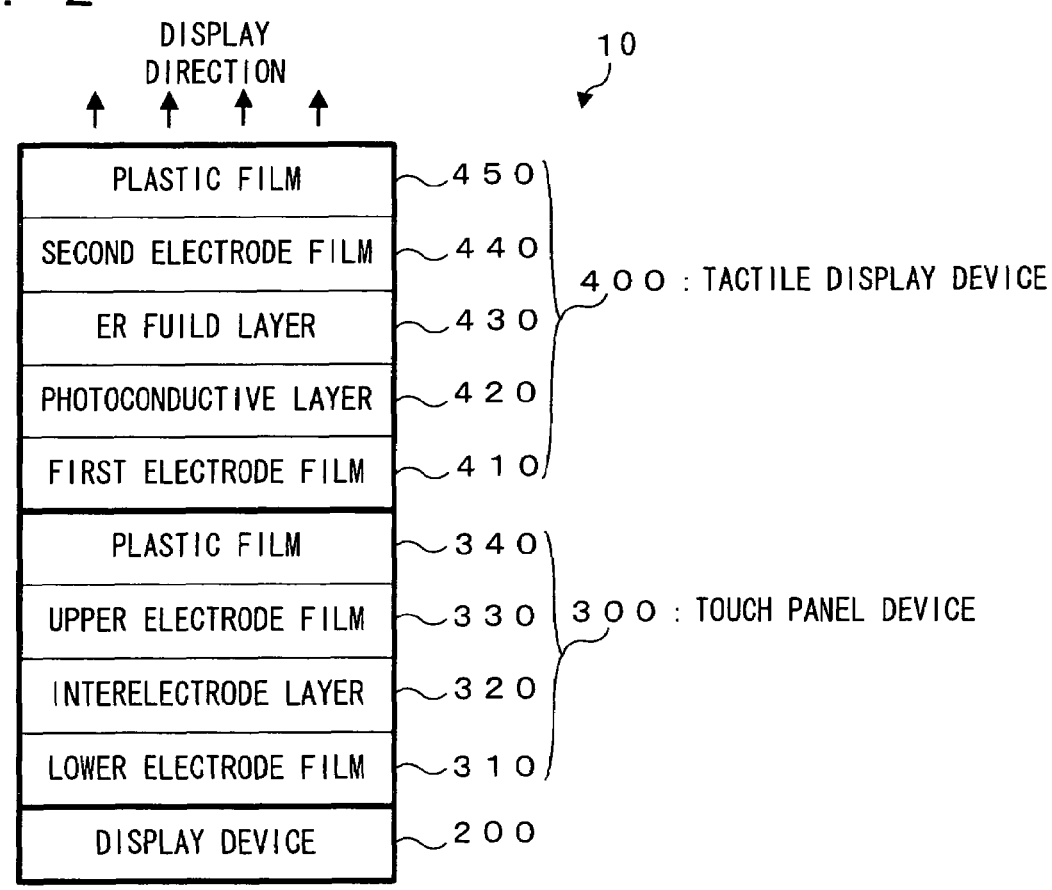
FIG. 2 is a schematic view illustrating a stack structure of the touch panel apparatus of FIG. 1.

Now, with reference to FIG. 2, an explanation will be made on the detail structure of the touch panel device 10. FIG. 2 generally shows a stack structure of the touch panel device 10.

In FIG. 2, the touch panel device 10 has a stack structure in which the display device 200, the touch panel device 300 and the tactile display device 400 are stacked in this order toward the display direction shown in the figure. Furthermore, the touch panel device 10 is constructed in such a manner that the visual information displayed on the display device 200 is viewed by the operator via the touch panel device 300 and the tactile display device 400 in this order.

The touch panel device 300 is formed on a glass substrate (not shown) of the display device 200, and has a stack structure in which a lower electrode film 310, an interelectrode layer 320, an upper electrode film 330 and a plastic film 340 are stacked in this order toward the display direction.

The lower electrode film 310 is an ITO (Indium Tin Oxide) thin film formed on the glass substrate of the display device by spattering method or the like. The lower electrode film 310 is a thin film having a light transmissive property (or optically transparent) and a conductive property.

The upper electrode film 330 is a thin film having a light transmissive property and a conductive property, formed by laminating an ITO thin film on a lower surface of the plastic film 340.

The plastic film 340, which may be made of an optically transparent resin such as PET, is adapted to act as a protect layer for protecting the upper electrode film 330 from any physical contact and adapted to bend or flex reversibly and integrally with the upper electrode film 330.

The interelectrode layer 320 is an interstitial layer between the upper electrode film 330 and the lower electrode film 310, and have a thickness on the order of 100 to 300 μm. Incidentally, the detail of the interelectrode layer 320 will be described later.

Figure 3:
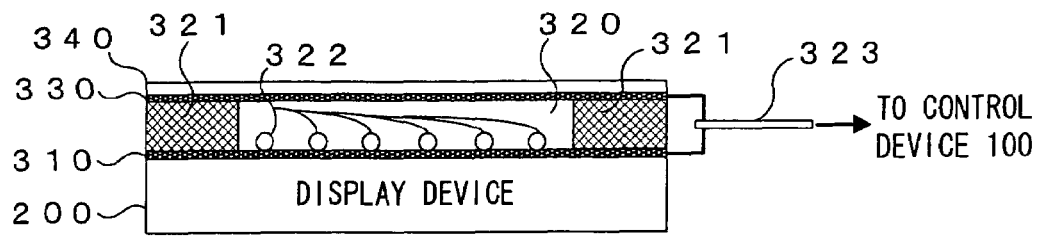
FIG. 3 is a schematic cross section illustrating a touch panel device of the touch panel apparatus of FIG. 1.
Figure 3:
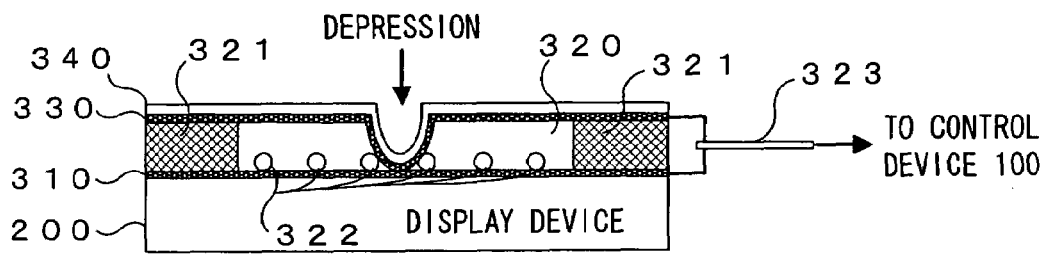

Now, with reference to FIG. 3, an explanation will be made on the detail structure of the touch panel device 300, with the basic operational principle. FIG. 3 schematically shows a sectional view of the touch panel device 300. Incidentally, from among elements in FIG. 3, the same elements as those of FIG. 2 carry the same numerals, and their explanation will be omitted.

In FIG. 3 (*a*), insulation portions 321 and dot spacers 322 are formed in the interelectrode layer 320. Incidentally, FIG. 3 (*a*) shows a sectional structure of the touch panel device 300 before the operation by the operator.

The insulation portions 321 are of an intervening insulation layer existing in the interelectrode layer 320, for electrically insulating the lower electrode film 310 and the upper electrode film 330 opposed to each other. The dot spacers 322 are insulating buffers, which may be made of UV cure ink, and are disposed for an improvement of easiness in the operation of the touch panel and for preventing a wrong input.

The lower electrode film 310 and the upper electrode film 330 are electrically connected to an FPC (Flexible Printed Circuit) substrate 323, respectively. The FPC substrate 323 is a flexible substrate on which a processing circuit is mounted for calculating coordinates of a contact point as described later. Furthermore, the FPC substrate 323 is adapted to output the calculated data of the coordinates of the contact point to the control device 100.

Incidentally, at a pair of both edge parts which direction are intersected perpendicularly (i.e. x-axis and y-axis, for example), the upper electrode film 330 and the lower electrode film 310, an electric power source and a wiring pattern (not shown in FIG. 3) are formed for applying an electrical voltage to detect the coordinates of the contact point.

In FIG. 3 (*b*), a sectional view of the touch panel device 300 is schematically illustrated when the touch panel device 300 is operated by the operator. Now, it is assumed that an arbitrary point of the plastic film 340 of the touch panel device 300 is depressed, in FIG. 3 (*b*). When it is depressed, the plastic film 340 is deformed integrally with the upper electrode film 330 downwardly in the figure, which causes a contact of a part of the upper electrode film 330 with a part of the lower electrode film 310, resulting in a short circuit.

Coordinates of the contact point of the upper electrode film 330 and the lower electrode film 310 in the X axis direction is calculated from a voltage value which is measured, when predetermined voltage is applied between both edge parts on the x-axis direction which is described above of the upper electrode film 330 as well as both edge parts on the y-axis direction of the lower electrode film 310 are released. In a similar way, coordinates of the contact point of the upper electrode film 330 and the lower electrode film 310 in the Y axis direction is calculated from a voltage value which is measured when predetermined voltage is applied between both edge parts on the y-axis direction which is described above of the lower electrode film 310 as well as both edge parts on the x-axis direction of the upper electrode film 330 are released. From these two calculated coordinates, the depressed point is identified. The touch panel device 300 is adapted to recognize the operation of the operator generally in accordance with the aforementioned way.

Referring back to FIG. 2, the tactile display device 400 is formed on the plastic film 340 of the touch panel device 300, and has a stack structure in which a first electrode film 410, a photoconductive layer 420, an electrorheological fluid layer (referred to as "ER fluid layer" in the figure) 430, a second electrode film 440 and a plastic film 450 are formed in this order toward the display direction.

The first electrode 410 and the second electrode film 440, each of which is an optically transparent conductive thin film made of ITO, are of an example of "a pair of electrodes" according to the present invention.

The photoconductive layer 420, which is a photoconductive layer made of organic materials having a stack structure in which a CGL (Carrier Generation Layer) of BZP (benzimidazole perylene), a CTL (Carrier Transfer Layer) of PVK (polyvinyl carbazole) and another layer of BZP are formed in this order, is of an example of the "photoconductive layer" which is a kind of the "characteristic change layer" according to the present invention. The photoconductive layer 420 exhibits higher conductivity as stronger the intensity of the irradiation light is, and exhibits lower conductivity as weaker the intensity of the irradiation light is.

In this embodiment, the photoconductive layer 420 is adapted to use the visual information displayed on the display device 200 as the irradiation light source. As mentioned above, since the display device 200 is adapted in such a manner that each pixel displays either while or black, the intensity of the irradiation light irradiated onto the photoconductive layer 420 has a binary value corresponding to white or black as well.

Incidentally, in this embodiment, a material or materials for the photoconductive layer is not or are not limited to any special material or materials, insofar as it has a light transmissive property and can change the conductivity in response to the intensity of the irradiation light. For example, it may be an inorganic material such as hydrogenated amorphous silicon. Furthermore, in the case that the photoconductive layer is made of organic material or materials, the aforementioned stack structure of the CGL and the CTL is typically employed. In this case, CuPc (cupper-phthalocyanine) may be used as the CGL, and TPD (triphenyldiamine) may be used as the CTL.

The electrorheological fluid layer 430, which has dielectric solid fine particles dispersed in an insulation fluid and which has a light transmissive property and another property or characteristic of changing the viscosity in response to the applied voltage, is an example of the "electrorheological fluid layer" according to the present invention. The electrorheological fluid layer 430 becomes harder as higher the applied voltage is, and becomes softer as lower the applied voltage is. Incidentally, an electrorheological fluid for the electrorheological fluid layer 430 may be determined without any limitation, insofar as the viscosity changes in response to the applied voltage.

The plastic film 450, which may be a protection film made of PET, is an example of the "flexible substrate" according to the present invention. Beneath the plastic film 450, the aforementioned second electrode film 440 is formed. The plastic film 450 and the second electrode film 440 are adapted to deform reversibly downwardly in the figure due to the operation of the operator. Incidentally, predetermined voltage is applied to the tactile display device 400, by means of a power supply circuit (not shown).

(Operation of Touch Panel Apparatus 10 with Tactile Display Function)

In the touch panel apparatus 10 with tactile display function having the aforementioned structure, the operator refers to the visual information displayed on the display device 200, and performs the information input by operating the touch panel device 300. Namely, the operator performs the operation as seen in operating a usual touch panel apparatus. However, since the touch panel apparatus 10 according to this embodiment is provide with the tactile display device 400, it is possible to add the tactile information to the usual touch panel operation. Now, the operation of the touch panel apparatus 10 will be discussed, focusing on the operation of the tactile display device 400.

Figure 4:
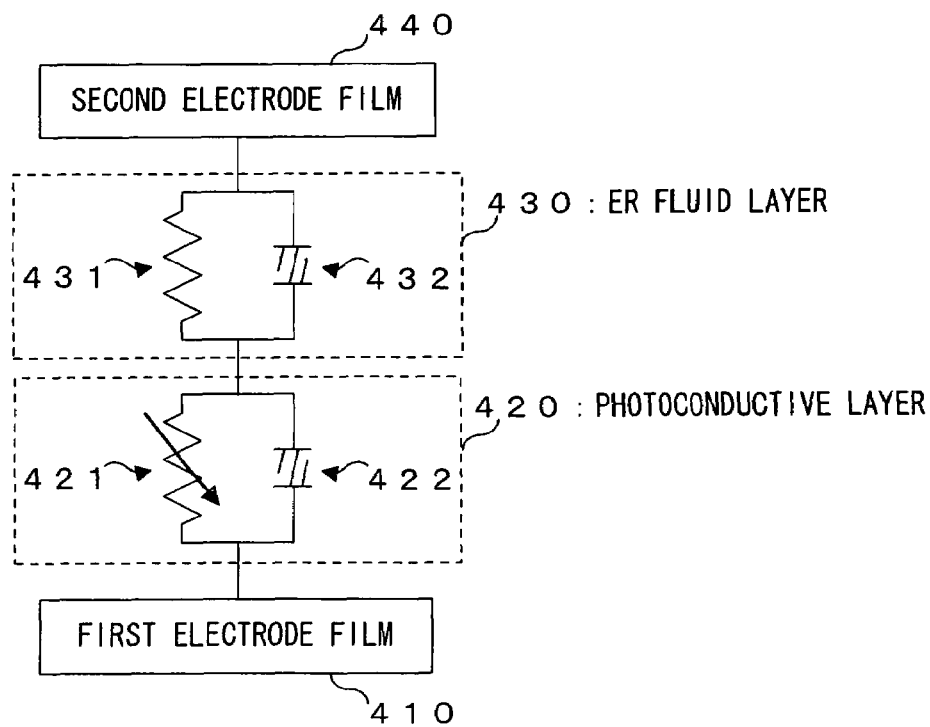
FIG. 4 is an equivalent circuit diagram of a tactile display device of the touch panel apparatus of FIG. 1.

First of all, an explanation will be made on a basic operation of the tactile display device 400, with reference to FIG. 4. FIG. 4 illustrates equivalent circuits of the tactile display device 400. Incidentally, in FIG. 4, the same elements or components as in FIG. 2 carry the same numerals, and the explanation of them are omitted.

In FIG. 4, the tactile display device 400 has a structure in which the photoconductive layer 420 and the electrorheological fluid layer 430 are disposed in series, each of which is shown as a parallel circuit made of a resistance part and a capacity part, between the first electrode film 410 and the second electrode film 440.

The parallel circuit for the photoconductive layer 420 is made of a resistance part 421 and a capacity part 422, while the parallel circuit for the electrorheological fluid layer 430 is made of a resistance part 431 and a capacity part 432. The resistance part 421 of the photoconductive layer 420 can be shown as a variable resistance, since the conductivity of the layer changes in response to the intensity of the irradiation light.

Once a resistance value of the resistance part 421 changes (i.e. the conductivity of the photoconductive layer 420 changes), a partial pressure ratio changes between the photoconductive layer 420 and the electrorheological fluid layer 430. That is, in the tactile display device 400, a relative level of the voltage applied to the electrorheological fluid layer 430 is determined, in response to the intensity of the irradiation light irradiated onto the photoconductive layer 420. As mentioned above, since the intensity of the irradiation light can take a binary value, the applied voltage applied to the electrorheological fluid layer 430 can also take a relative binary value.

In particular, at a part displayed as white on the display device 200, as well as at the corresponding part of the photoconductive layer 420, the resistance value of the resistance part 421 decreases, the partial pressure of the electrorheological fluid layer 430 increases, and the applied voltage to the electrorheological fluid layer 430 relatively increases. On the contrary, at a part displayed as black on the display device 200, as well as at the corresponding part of the photoconductive layer 420, the resistance value of the resistance part 421 does not change, and the applied voltage to the electrorheological fluid layer 430 relatively decreases. In the case that yield stress is employed as an indicator of the viscosity, the electrorheological fluid layer 430 is adapted in such a manner that the yield stress of the electrorheological fluid layer 430 becomes 130 kPa and 10 kPa, in response to the increased voltage and the decreased voltage, respectively.

Figure 5:
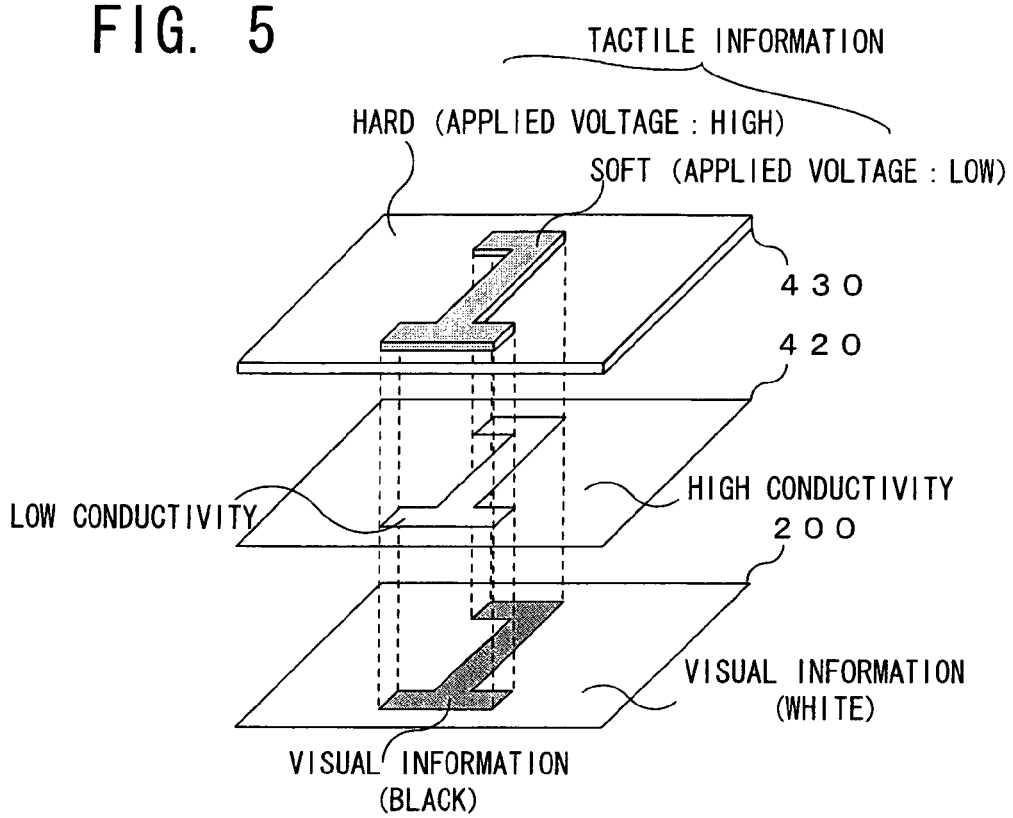
FIG. 5 is a perspective view schematically illustrating the touch panel apparatus of FIG. 1.

Now, an explanation will be made on a specific operation of the tactile display device 400, with reference to FIG. 5. FIG. 5 schematically illustrates the touch panel apparatus 10 in a perspective view. Incidentally, in this figure, the same elements or components as in FIG. 2 carry the same numerals, and the explanation of them is omitted.

In FIG. 5, the visual information "1", which is an example of the "visual information to prompt the input operation" according to the present invention, is displayed on the display device 200. This visual information reaches the photoconductive layer 420 through the touch panel device 300 (not shown in FIG. 5) opposite to the display device 200. At the photoconductive layer 420, the conductivity of a part corresponding to black color (i.e. the part indicating "1") does not change, and the conductivity of a part corresponding to while color (i.e. the area other than the part indicating "1") increases.

As a result, at the electrorheological fluid layer 430, the viscosity of the area other than the part indicating "1" changes so that this area becomes harder, and the viscosity of the part indicating "1" does not change so that this area becomes relatively softer. The tactile impression due to the viscosity change, differentiating the hard part from the soft part, is transmitted to the operator through the plastic film 450. The thickness of the plastic film 450 is determined within a range so as not to disturb this tactile impression. That is, according to the tactile display device 400, it is possible to present to the operator the tactile impression due to the difference in the viscosity of the electrorheological fluid layer 430, differentiating the hard part from the soft part, as the tactile information, when the operator operates the touch panel device 300 (not shown in FIG. 5) in order to select the visual information "1" displayed on the display device 200.

As mentioned above, according to the touch panel apparatus 10 with tactile display function, it is possible to change the viscosity of the electrorheological fluid layer 430 by means of the visual information on the display device 200, i.e. by means of so-called "light input". Therefore, it is possible to present the tactile information effectively.

Incidentally, a type or kind of the electrorheological fluid composing the electrorheological fluid layer 430, the thickness of the electrorheological fluid layer 430, a type or kind of the photoconductive material composing the photoconductive layer 420, the thickness of the photoconductive layer 420 and a voltage value applied to the tactile display device 400 and so on are determined experimentally, empirically otherwise via simulation, in order to present the tactile information appropriately.

Incidentally, in this embodiment, the display device 200 displays only the binary information indicating black or white. Nevertheless, the display device 200 may be a display device capable of performing a full-color display as seen in a usual full-color display device. In this case, although the viscosity of the electrorheological fluid layer 430 may change with a great variety, the electrorheological fluid layer 430 and the photoconductive layer 420 may be sufficiently adapted in such a manner that the viscosity of the part corresponding to black color differs significantly from the viscosity of the remaining area.

Incidentally, the touch panel device 300 may be embodied in various types such as an existing capacitance type, an existing infrared type, an existing piezoelectric type, an existing electromagnetic induction type, an existing SAW (surface acoustic wave) type, an existing non-contact optical type and so on, without limited to the resistance film type using ITO which is exemplified in this embodiment.

Second Embodiment

Figure 6:
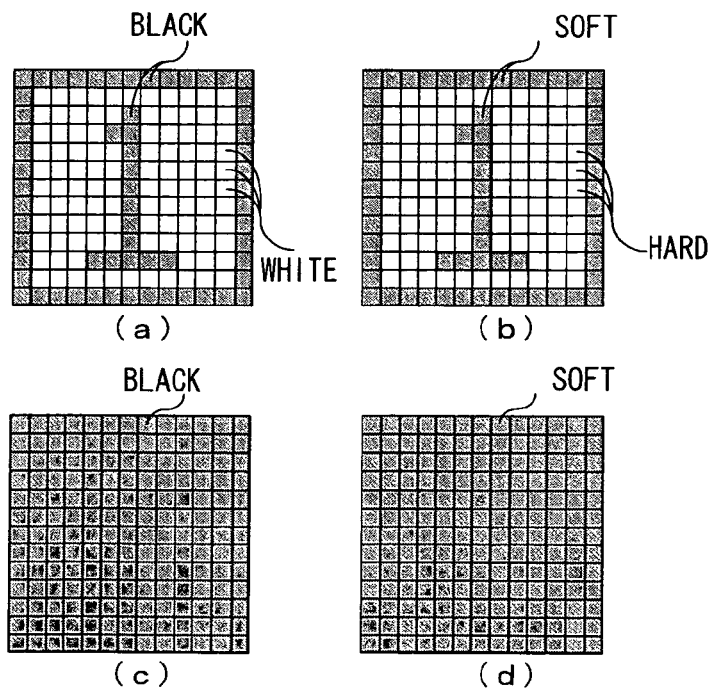
FIG. 6 is a plan view schematically illustrating display screens in a tactile addition process in a second embodiment of the present invention.

In the aforementioned first embodiment, there is even a possibility of a discomfort feeling about the operation, if the viscosity of the electrorheological fluid layer 430 does not change even in the case that the operator depresses the plastic film 450 to select the visual information such as a button. In the second embodiment, this problem is solved by the CPU 110 which performs a tactile addition process as explained below (i.e. acts as an example of the "change addition device" according to the present invention). Hereinbelow, an explanation will be made on the second embodiment of the present invention, with reference to FIG. 6 and FIG. 7. FIG. 6 schematically illustrates a display screen in the tactile addition process in a plan view, and FIG. 7 is a flow chart of the tactile addition process.

Incidentally, a construction or structure in the second embodiment is the same as the first embodiment, because the second embodiment is of an explanation about the process performed by the control device 100 in the first embodiment. Therefore, in the aftermentioned explanation of the second embodiment, elements or components the same as in the first embodiment carry the same numerals and the explanation of them is omitted as appropriate.

Figure 7:
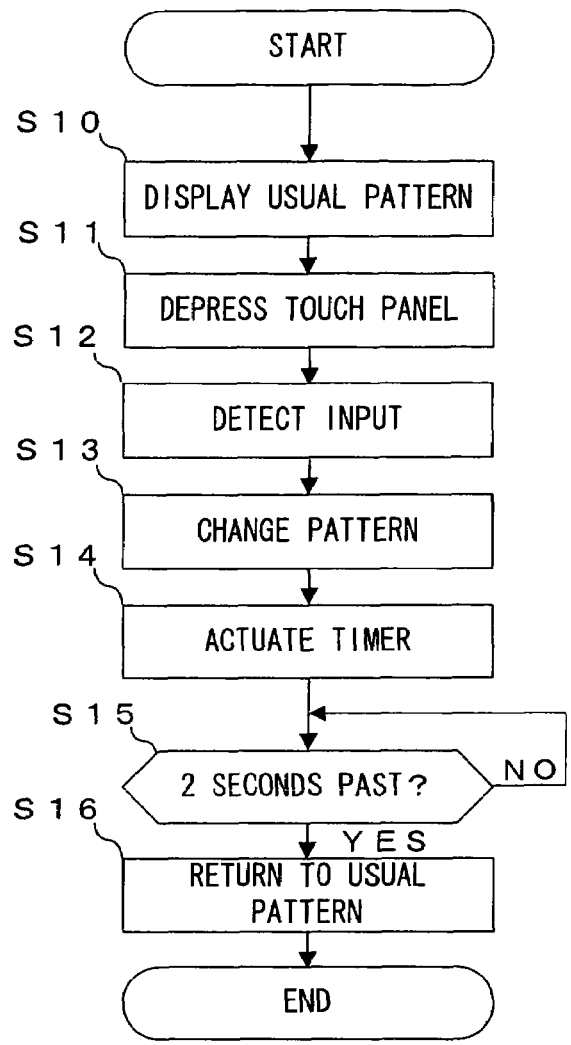
FIG. 7 is a flow char of the tactile addition process.

In FIG. 7, the CPU 110 of the control device 100 displays the typical visual information (step S10). The typical visual information means visual information "1" as described in the first embodiment. In this second embodiment, there is displayed the visual information in which the numeral character "1" is encompassed within a square frame.

In FIG. 6 (*a*), there is shown a status of the display device 200 at step S10. In this status, the part indicating "1" and the surrounding square part are shown as black, and the remaining area are shown as white. This visual information is the same as a numeric key for an ATM of a bank, for example.

Furthermore, in FIG. 6 (*b*), there is shown a status of the electrorheological fluid layer 430, correspondingly to FIG. 6 (*a*). In this status, as described above, a part corresponding to the black part of the display device 200 becomes softer and a part corresponding to the white part of the display device 200 becomes harder.

Referring back to FIG. 7, it is assumed that the operator selects this visual information at a certain time point and depresses a part of the plastic film 450 corresponding to this visual information (step S11). The pressure resulting from this depression is transmitted to the tactile display device 400 and further to the touch panel device 300, so that the coordinate information indicating the display position of the visual information on the display device 200 is outputted from the FPC substrate 323 and stored into the memory 120, as shown in FIG. 3 (*b*). The CPU 110 detects a fact that the visual information is selected (i.e. "1" is inputted by the operator) (step S12), due to a fact that the coordinate data is stored into the memory 120.

Then, the CPU 110 changes a display pattern of the selected visual information on the display device 200 (step S13). Specifically, a display pattern as shown in FIG. 6 (*c*) is generated, with the coordinate data being read from the memory 120, and displayed in an area where the display pattern as shown in FIG. 6 (*a*) exists. That is, the entire display area for the visual information becomes block.

Thus the display pattern of the selected visual information is changed on the display device 200, the viscosity of the electrorheological fluid layer 430 of the tactile display device 400 may change. That is to say, an irradiation of a light from the display device 200 disappears, the fluid situation of the electrorheological fluid layer 430 is changed from one situation that soft part and hard part are mixed as shown in FIG. 6 (*b*), to the other situation that the entire corresponding part becomes softer as shown in FIG. 6 (*d*).

As described above, once the tactile information changes, the part which has been hard (i.e. the area other than the part corresponding to "1") becomes softer, so that the operator feels a tactile impression as if a button was depressed.

The CPU 110 actuates an internal timer (step S14) at the same time of changing such a display pattern, and judges whether or not two seconds lapses from a change of a display pattern (step S15). If it is shorter than two seconds (step S15: No), the CPU 110 waits with doing nothing. If it is two seconds or longer (step S15: Yes), the CPU 110 changes the display pattern back to the former pattern (step S16). That is, a display pattern displayed on the display device 200 is recovered to a display pattern as shown in FIG. 6 (*a*). Once the display pattern is recovered, the CPU 110 terminates the tactile addition process.

Incidentally, although this two seconds is determined as a typical time period for depressing a button as seen in a usual button operation, a time period to be detected by the internal timer may be any value.

As described above, according to the tactile addition process in the second embodiment, it is possible to improve the discomfort feeling which the operator may feel when operating the touch panel apparatus in a simple manner, so that the handling is further improved.

Modified Embodiment

Figure 8:
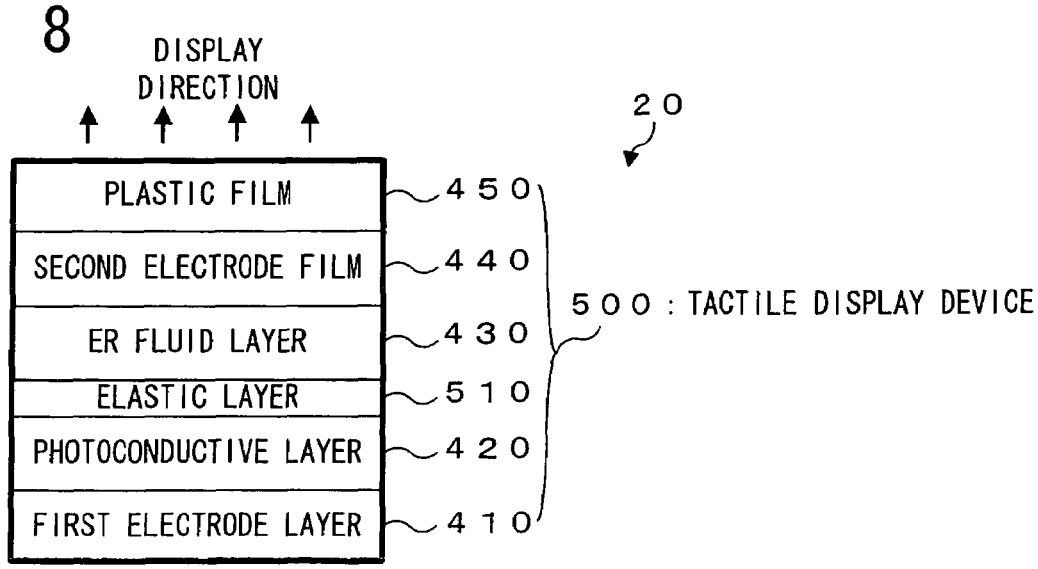
FIG. 8 is a schematic view illustrating a stack structure of a touch panel apparatus in a modified embodiment of the present invention.

Incidentally, the construction or structure of the touch panel apparatus with tactile display function is not limited to the construction or structure illustrated in the aforementioned embodiments. For example, it is easy to employ a construction or structure as mentioned below. Now, an explanation will be made on a modified embodiment of the present invention, with reference to FIG. 8. FIG. 8 schematically illustrates a structure of a tactile display device 500 of a touch panel apparatus with tactile display function 20 in the modified embodiment of the present invention. Incidentally, in this figure, elements or components the same as in FIG. 2 carry the same numerals, and the explanation of them is omitted.

In FIG. 8, the touch panel apparatus with tactile display function 20 is different from the aforementioned embodiments, in a point that there is provided with the tactile display device 500, instead of the tactile display device 400, in which an elastic layer 510 is sandwiched between the photoconductive layer 420 and the electrorheological fluid layer 430. Incidentally, in FIG. 8, the touch panel device 300 and the display device 200 are not shown.

The elastic layer 510 is made of a resin material having a light transmissive property, such as an optically transparent rubber. Thus, this intervening elastic layer 510 further improves the tactile impression when the operator depressed the plastic film 450. That is, the thickness of the elastic layer 510 in addition to the thickness of the electrorheological fluid layer 430 presents to the operator further improved tactile impression at his/her finger when depressing the plastic film 450. The voltage applied to the electrorheological fluid layer 430 and the tactile impression obtained from the electrorheological fluid layer 430 are in a trade-off relationship. Therefore, in order to decrease the applied voltage and realize a compact structure of the apparatus, it is necessary to decrease the thickness of the electrorheological fluid layer 430, while sacrificing the tactile impression. Nevertheless, according to the modified embodiment of the present invention, it is easy to realize the apparatus with the suitable balance between the applied voltage and the tactile impression.

Incidentally, a position of the intervening elastic layer is not limited to the embodiment shown in FIG. 8. For example, it is possible to dispose the elastic layer beneath the photoconductive layer 430. Furthermore, depends on the situation, it is possible to employ a plurality of elastic layers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-185323 filed on Jun. 23, 2004 including the specification, claims, drawings and summary is incorporated herein by reference in its entirety.

What is claimed is:

1. A tactile display device disposed on a display screen for outputting display light corresponding to a display pattern, said tactile display device comprising:
    a pair of electrodes having a light transmissive property and disposed opposite to the display screen;
    a characteristic change layer disposed between said pair of electrodes, said characteristic change layer having a light transmissive property, wherein at least one of conductivity and magnetic permeability of said characteristic change layer changes at each part on the display screen in response to intensity of the display light; and
    an electrorheological fluid layer disposed between said pair of electrodes and opposite to said characteristic change layer, said electrorheological fluid layer having a light transmissive property, wherein viscosity of said electrorheological fluid layer changes at each part on the display screen in response to applied voltage applied through said characteristic change layer by said pair of electrodes.

2. The tactile display device according to claim 1, wherein said characteristic change layer is a photoconductive layer, the conductivity of which changes at each part on the display screen in response to the intensity of the display light.

3. The tactile display device according to claim 1, further comprising
    an elastic layer beneath said electrorheological fluid layer above the display screen, said elastic layer having elastic modulus less than that of said electrorheological fluid layer.

4. The tactile display device according to claim 2, further comprising
    an elastic layer beneath said electrorheological fluid layer above the display screen, said elastic layer having elastic modulus less than that of said electrorheological fluid layer.

5. The tactile display device according to claim 1, further comprising
    a flexible substrate having a light transmissive property, wherein
    said pair of electrodes, said characteristic change layer and said electrorheological fluid layer are disposed above said flexible substrate.

6. The tactile display device according to claim 3, further comprising
    a flexible substrate having a light transmissive property, wherein
    said pair of electrodes, said characteristic change layer and said electrorheological fluid layer are disposed above said flexible substrate.

7. A touch panel apparatus with tactile display function, said touch panel apparatus comprising:
    an optically transparent touch panel disposed opposite to a display screen for outputting display light and for allowing an input operation of depressing a part of said optically transparent touch panel corresponding to a part of the display screen in which visual information was displayed, the visual information displayed as the display pattern on the display screen and the visual information being for prompting the input operation; and
    said tactile display device according to claim 1 disposed opposite to said optically transparent touch panel at a side different from another side where said optically transparent touch panel is directed toward the display screen.

8. The touch panel apparatus with tactile display function according to claim 7, further comprising
    a change addition device for further changing the viscosity of at least a part of said electrorheological fluid layer, if said at least a part of said electrorheological fluid layer is depressed.

9. The touch panel apparatus with tactile display function according to claim 7, further comprising
    a display device having the display screen and for displaying the visual information on the display screen.

10. The touch panel apparatus with tactile display function according to claim 8, further comprising
    a display device having the display screen and for displaying the visual information on the display screen.

11. A touch panel apparatus with tactile display function comprising:
    a tactile display device disposed on a display screen for outputting display light corresponding to a display pattern, said device comprising: (1) a pair of electrodes having a light transmissive property and disposed opposite to the display screen; (2) a characteristic change layer disposed between said pair of electrodes, said characteristic change layer having a light transmissive property, wherein at least one of conductivity and magnetic permeability of said characteristic change layer changes at each part on the display screen in response to intensity of the display light; and (3) an electrorheological fluid layer disposed between said pair of electrodes and opposite to said characteristic change layer, said electrorheological fluid layer having a light transmissive property, wherein viscosity of said electrorheological fluid layer changes at each part on the display screen in response to applied voltage applied through said characteristic change layer by said pair of electrodes;
    an optically transparent touch panel disposed between said tactile display device and the display screen and opposite to the display screen, said optically transparent touch panel allowing an input operation of depressing a part corresponding to a part of the display screen in which visual information was displayed, the visual information displayed as the display pattern on the display screen and the visual information being for prompting the input operation; and
    a change addition device for further changing the viscosity of at least a part of said electrorheological fluid layer, if said at least a part of said electrorheological fluid layer is depressed.

12. The touch panel apparatus with tactile display function according to claim 8, further comprising
    a display device having the display screen and for displaying the visual information on the display screen, wherein
    said change addition device further changes the viscosity for a change of the visual information by said display device.

13. The touch panel apparatus with tactile display function according to claim 11, further comprising
    a display device having the display screen and for displaying the visual information on the display screen, wherein
    said change addition device further changes the viscosity for a change of the visual information by said display device.

* * * * *